(12) United States Patent
Zhou et al.

(10) Patent No.: US 10,759,037 B2
(45) Date of Patent: Sep. 1, 2020

(54) HYDRAULIC TOOL

(71) Applicant: EMERSON PROFESSIONAL TOOLS (SHANGHAI) CO., LTD., Shanghai (CN)

(72) Inventors: Qi Zhou, Shanghai (CN); Leihua Chen, Shanghai (CN)

(73) Assignee: RIDGE TOOL COMPANY, Elyria, OH (US)

( * ) Notice: Subject to any disclaimer, the term of this patent is extended or adjusted under 35 U.S.C. 154(b) by 113 days.

(21) Appl. No.: 15/777,702

(22) PCT Filed: Feb. 24, 2017

(86) PCT No.: PCT/CN2017/074719
§ 371 (c)(1),
(2) Date: May 21, 2018

(87) PCT Pub. No.: WO2017/118444
PCT Pub. Date: Jul. 13, 2017

(65) Prior Publication Data
US 2018/0345473 A1   Dec. 6, 2018

(30) Foreign Application Priority Data

Jan. 5, 2016 (CN) .......................... 2016 1 0003933
Jan. 5, 2016 (CN) ..................... 2016 2 0005440 U

(51) Int. Cl.
*B25F 5/00* (2006.01)
*B25B 27/10* (2006.01)
(Continued)

(52) U.S. Cl.
CPC ............... *B25F 5/005* (2013.01); *B25B 5/04* (2013.01); *B25B 5/16* (2013.01); *B25B 27/10* (2013.01);
(Continued)

(58) Field of Classification Search
CPC .... B25B 5/02; B25B 5/04; B25B 5/16; B25B 27/10; B25B 27/026; B25F 5/005
See application file for complete search history.

(56) References Cited

U.S. PATENT DOCUMENTS

2005/0115064 A1   6/2005   Pulohasingam et al.

FOREIGN PATENT DOCUMENTS

CN   201047368 Y   4/2008
CN   101370604 A   2/2009
(Continued)

OTHER PUBLICATIONS

Machine translation of CN104171698, Chen et al. translated on Dec. 19, 2019, pp. 1-14 (Year: 2019).*
(Continued)

*Primary Examiner* — Teresa M Ekiert
(74) *Attorney, Agent, or Firm* — Mark E. Bandy; Rankin, Hill & Clark LLP

(57) ABSTRACT

The present invention relates to a hydraulic tool including a working unit, a driving unit, a connection unit, and a switching device. The working unit is adapted to operate a workpiece. The driving unit is configured to drive the working unit and comprises a housing and a movable part provided in the housing and movable between an initial position and an end position. The connection unit connects the working unit and the driving unit. The switching device can rotate between a first position and a second position. When the switching device is in the first position, the movable part of the driving unit has a first stroke from the initial position to the end position; when the switching device is in the second position, the movable part of the driving unit has a second stroke smaller than the first stroke.

16 Claims, 14 Drawing Sheets

(51) Int. Cl.
  *B25B 5/04* (2006.01)
  *B25B 5/16* (2006.01)
  *B25F 5/02* (2006.01)
  *B25B 27/02* (2006.01)
  *B23D 29/00* (2006.01)
  *B23D 17/06* (2006.01)

(52) U.S. Cl.
  CPC ............... *B25F 5/02* (2013.01); *B23D 17/06* (2013.01); *B23D 29/00* (2013.01); *B25B 27/026* (2013.01)

(56) References Cited

FOREIGN PATENT DOCUMENTS

| | | |
|---|---|---|
| CN | 105171698 A | 12/2015 |
| CN | 105500278 A | 4/2016 |
| CN | 205325587 U | 6/2016 |

OTHER PUBLICATIONS

Machine translation of CN201047368, Yang, translated on Dec. 19, 2019, pp. 1-3. (Year: 2019).*

* cited by examiner

HYDRAULIC TOOL

CROSS REFERENCES TO RELATED APPLICATIONS

The present application is a U.S. national stage application from International Patent Application No. PCT/CN2017/074719 filed on Feb. 24, 2017, which is hereby incorporated by reference in its entirety. The International Patent Application No. PCT/CN2017/074719 claims priority to Chinese Patent Applications No. 201610003933.5 and 201620005440.0, filed with the State Intellectual Property Office of the People's Republic of China on Jan. 5, 2016, which are both incorporated herein by reference in their entirety.

TECHNICAL FIELD

The present invention relates to a hydraulic tool, in particular a hydraulic tool for a workpiece such as a tube.

BACKGROUND

The contents of this section merely provide background information related to the present disclosure and may not constitute the prior art.

In general, a hydraulic tool (also referred to as a crimping tool in some cases) for crimping a workpiece such as a tube includes a working unit (also referred to as a crimping unit in some cases), a driving unit for driving the working unit to process the workpiece, and a connection unit for connecting the working unit to the driving unit. The driving unit is typically a hydraulic driving unit that includes a hydraulic cylinder, a piston and a piston rod accommodated in the hydraulic cylinder. The piston and the piston rod are herein collectively referred to as a movable part. After the hydraulic tool is assembled, the movable part of the driving unit typically has a single stroke.

Therefore, there is a need in the art for a hydraulic tool with changeable stroke and/or replaceable working unit.

SUMMARY

An object of the present invention is to provide a hydraulic tool with changeable stroke and/or replaceable working unit. The hydraulic tool is applicable to a variety of applications or workpieces.

Another object of the present invention is to provide a low-cost hydraulic tool.

One or more of the above objects can be achieved by the following scheme: a hydraulic tool, comprising a working unit, a driving unit, a connection unit, and a switching device. The working unit is adapted to operate a workpiece. The driving unit is configured to drive the working unit and comprises a housing and a movable part provided in the housing and movable between an initial position and an end position. The connection unit connects the working unit and the driving unit. The switching device is able to rotate between a first position and a second position. When the switching device is in the first position, the movable part of the driving unit has a first stroke from the initial position to the end position; when the switching device is in the second position, the movable part of the driving unit has a second stroke smaller than the first stroke.

Preferably, the switching device is a sleeve provided on the outer surface of the connection unit.

Preferably, the switching device comprises a stopper. When the switching device is in the first position, the stopper of the switching device does not prevent the movement of the movable part of the driving unit such that the movable part is able to move between the initial position and the end position. When the switching device is in the second position, the stopper of the switching device is able to stop the movable part of the driving unit at an intermediate position between the initial position and the end position, such that the movable part is able to move between the intermediate position and the end position.

Preferably, the hydraulic tool further comprises a driving member for driving the working unit. The driving member is mounted on a bracket. The bracket is fixedly mounted at an end of a piston rod of the driving unit. The stopper of the switching device is configured to stop the bracket.

Preferably, the stopper is a projection member extending from the inner surface of the sleeve, and the projection member is integrally formed with the sleeve or separately formed with the sleeve and mounted to the sleeve.

Preferably, the hydraulic tool further comprises a positioning device for positioning the switching device in the first position and/or in the second position.

Preferably, the positioning device includes a ball, and an elastic member for applying a biasing force to the ball. An accommodation part for accommodating the ball and the elastic member is provided in the connection unit. A first hole and a second hole are provided in the switching device. When the switching device is in the first position, the elastic member presses the ball such that the ball abuts against the first hole; and when the switching device is in the second position, the elastic member presses the ball such that the ball abuts against the second hole.

Preferably, the hydraulic tool further comprises a limiter for limiting the axial position of the switching device.

Preferably, the limiter comprises a collar provided adjacent to one end of the switching device, and/or a step part provided adjacent to the other end of the switching device and located on the outer surface of the connection unit.

Preferably, the connection unit comprises a base part, and a first leg and a second leg extending parallel from the base part. The working unit is mounted between the first leg and the second leg. The base part is connected to the driving unit or is a part of the driving unit.

Optionally, the switching device comprises a base part, and a first leg and a second leg extending parallel from the base part. When the switching device is in the first position, a first recess formed between the first leg and the second leg of the switching device is aligned with a second recess formed between the first leg and the second leg of the connection unit. When the switching device is in the second position, the first leg and/or the second leg of the switching device at least partially cover the second recess of the connection unit. Such structure has better adaptation for working units with different specifications.

When the switching device is in the first position, the first stroke of the movable part is between 90 mm and 265 mm, preferably 100 mm.

In addition, when the switching device is in the second position, the second stroke of the movable part is between 35 mm and 50 mm, preferably 41 mm.

The hydraulic tool according to the present invention may be a crimping tool or a cutting tool, in particular a crimping tool or a cutting tool for a tubular workpiece.

BRIEF DESCRIPTION OF THE DRAWINGS

The features and advantages of one or more embodiments of the present invention will be more readily understood from the following description with reference to the accompanying drawings, in which.

DETAILED DESCRIPTION

Figure 1:
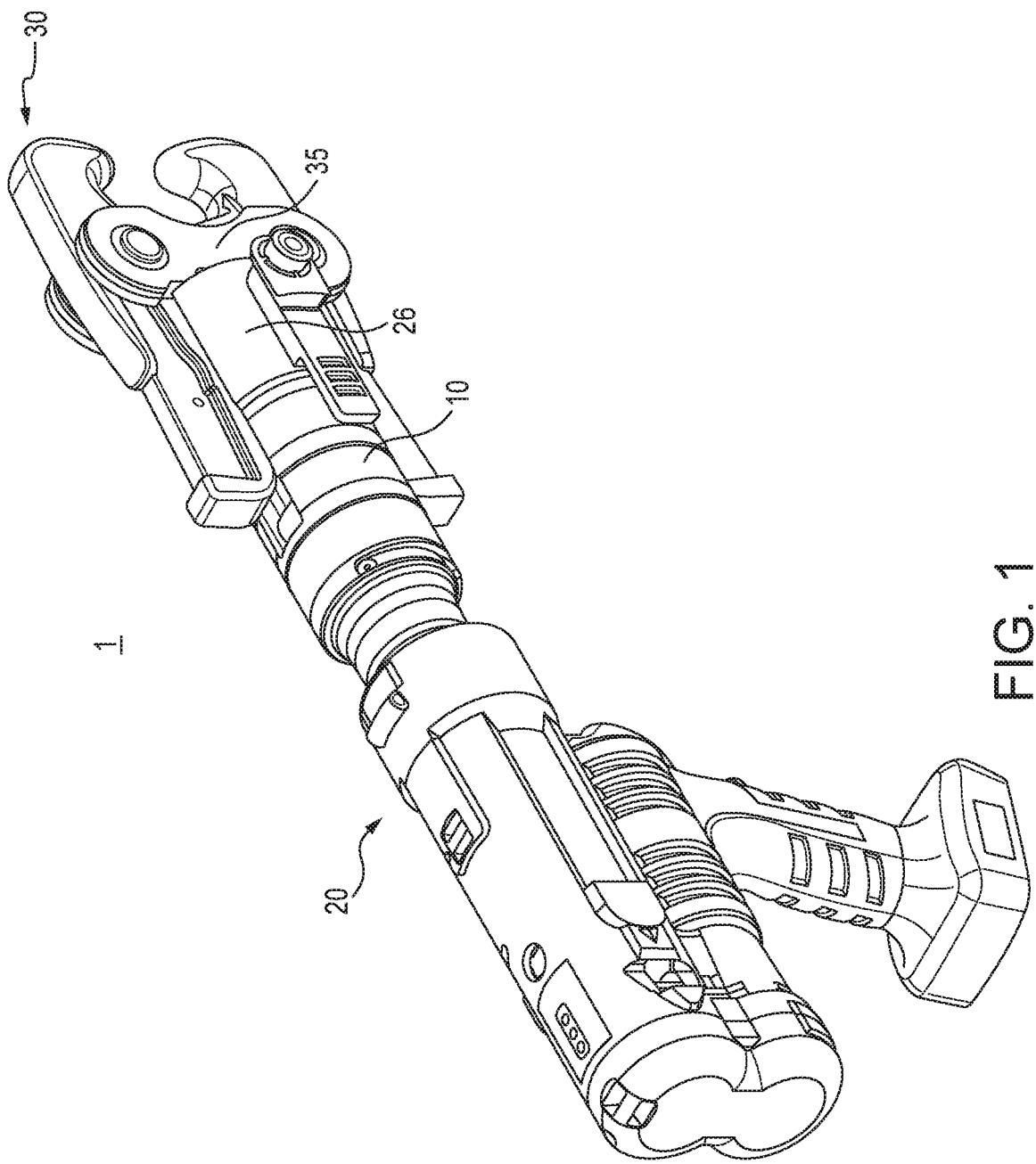
FIG. 1 is a schematic perspective view of a hydraulic tool according to an embodiment of the present invention.

The following description of the preferred embodiments is merely exemplary and is by no means intended to limit the present invention or its application or use. The same components are denoted by the same reference numerals in various drawings, and thus the configurations of the same components will not be repeatedly described.

A hydraulic tool according to an embodiment of the present invention will be described below with reference to FIGS. 1 to 10. It should be understood that, for the purpose of illustration, the principle of the present invention will be described with reference to an example crimping tool for operating a tube. However, the present invention is not limited to a crimping tool. For example, the present invention may also be applied to a clamping tool, a cutting tool, a pressing tool, and the like.

Referring to FIG. 1, illustrating a crimping tool for crimping a tube according to an embodiment of the present invention. As shown in FIG. 1, the crimping tool 1 according to the embodiment of the present invention may take the form of a hand-held electrical tool. The crimping tool 1 may include a crimping unit 30 (or referred to as a working unit), a driving unit 20, and a connection unit 26 positioned between the crimping unit 30 and the driving unit 20. The crimping unit 30 may be configured to crimp a workpiece such as a tube. The driving unit 20 may be configured to drive the crimping unit 30.

Figure 2:
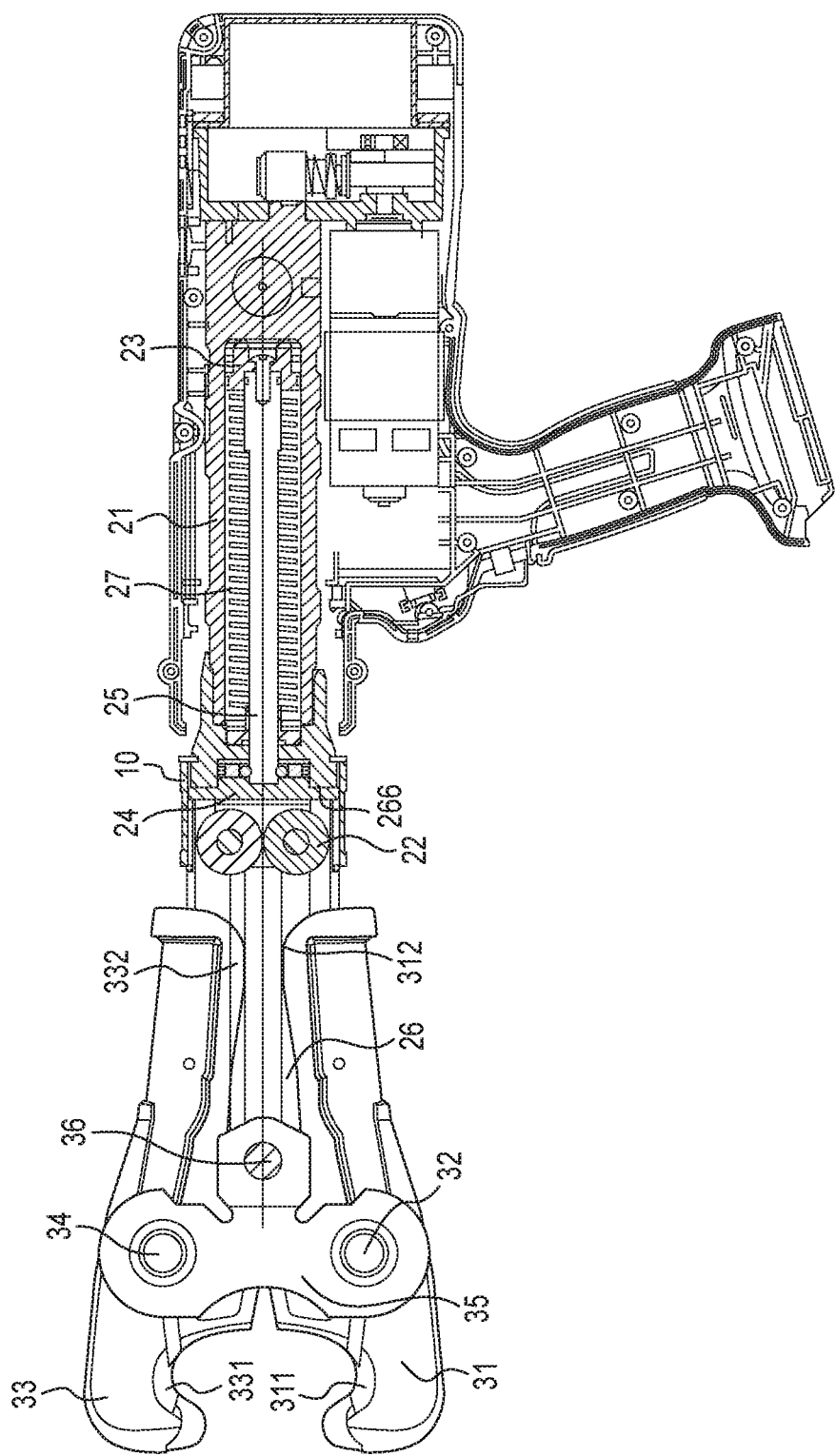
FIG. 2 is a schematic longitudinal sectional view of the hydraulic tool according to the embodiment of the present invention, wherein a switching device of the hydraulic tool is in a first rotation position and a roller is in an initial position.

Referring to FIG. 2, which is a schematic longitudinal sectional view of the hydraulic tool according to the embodiment of the present invention. As shown in FIG. 2, the crimping unit 30 includes two crimping members 31 and 33. The two crimping members 31 and 33, which may take the form of plates, are arranged side by side in one plane and adjacent to each other. Preferably, the crimping members 31 and 33 may have substantially the same structure and be substantially symmetrical to each other with respect to an axis therebetween, wherein the axis, which may be referred to as an axis of symmetry, is substantially perpendicular to the longitudinal axis of the workpiece (e.g., tube) to be crimped. For convenience of description, sides (faces) of the crimping members 31 and 33, which are adjacent to each other, are herein referred to as inner sides (faces), and sides (faces) away from each other are referred to as outer sides (faces); while ends (parts) of the crimping members 31 and 33, which are adjacent to the driving unit, are referred to as inner ends (parts), and ends (parts) away from the driving unit are referred to as outer ends (parts).

The crimping members 31 and 33 each includes a crimping part and a driving part for driving the crimping part. The crimping parts of the crimping members 31 and 33 are close to the outer ends and include, in their inner sides, crimping faces 311 and 331. The workpiece is accommodated in a space formed by the crimping faces 311 and 331 of the crimping members 31 and 33. The driving parts of the crimping members 31 and 33 are close to the driving unit, and include, in their inner sides, cam faces 312 and 332 (or referred to as driven faces).

The crimping members 31 and 33 may be mounted between two side plates 35 by a pin connection. As shown in the drawings, the crimping member 33 is connected between the two side plates 35 by a pin 34, and the crimping member 31 is connected between the two side plates 35 by a pin 32. In this way, when the cam faces 312 and 332 are driven by the driving unit, the crimping member 31 pivots about the pin 32, and the crimping member 33 pivots about the pin 34. That is, when the cam faces 312 and 332 pivot away from each other, the crimping faces 311 and 331 pivot toward each other, and vice versa.

In the illustrated example, the side plates 35 are substantially T-shaped, and include a lateral part and a leg part. Holes for receiving the pins 32 and 34 are respectively provided at the two ends of the lateral part, and a hole for receiving a pin 36 is provided in proximity to the free end of the leg part, wherein the pin 36 is used to connect the crimping unit 30 to the connection unit 26 which is in turn connected to the driving unit 20.

The driving unit 20 may be a hydraulic driving unit. In one example, the driving unit 20 may include a cylinder body 21 and a movable part. The cylinder body 21 has an internal cavity in which the movable part, which is movable under hydraulic action, is accommodated. The cylinder body 21 may be a housing of the driving unit in some examples. The cylinder body 21 may also be referred to as a stationary part of the driving unit 20. In the case of a hydraulic driving unit, the movable part may include a piston 23 and a piston rod 25 connected to and moving together with the piston 23.

Figure 3:
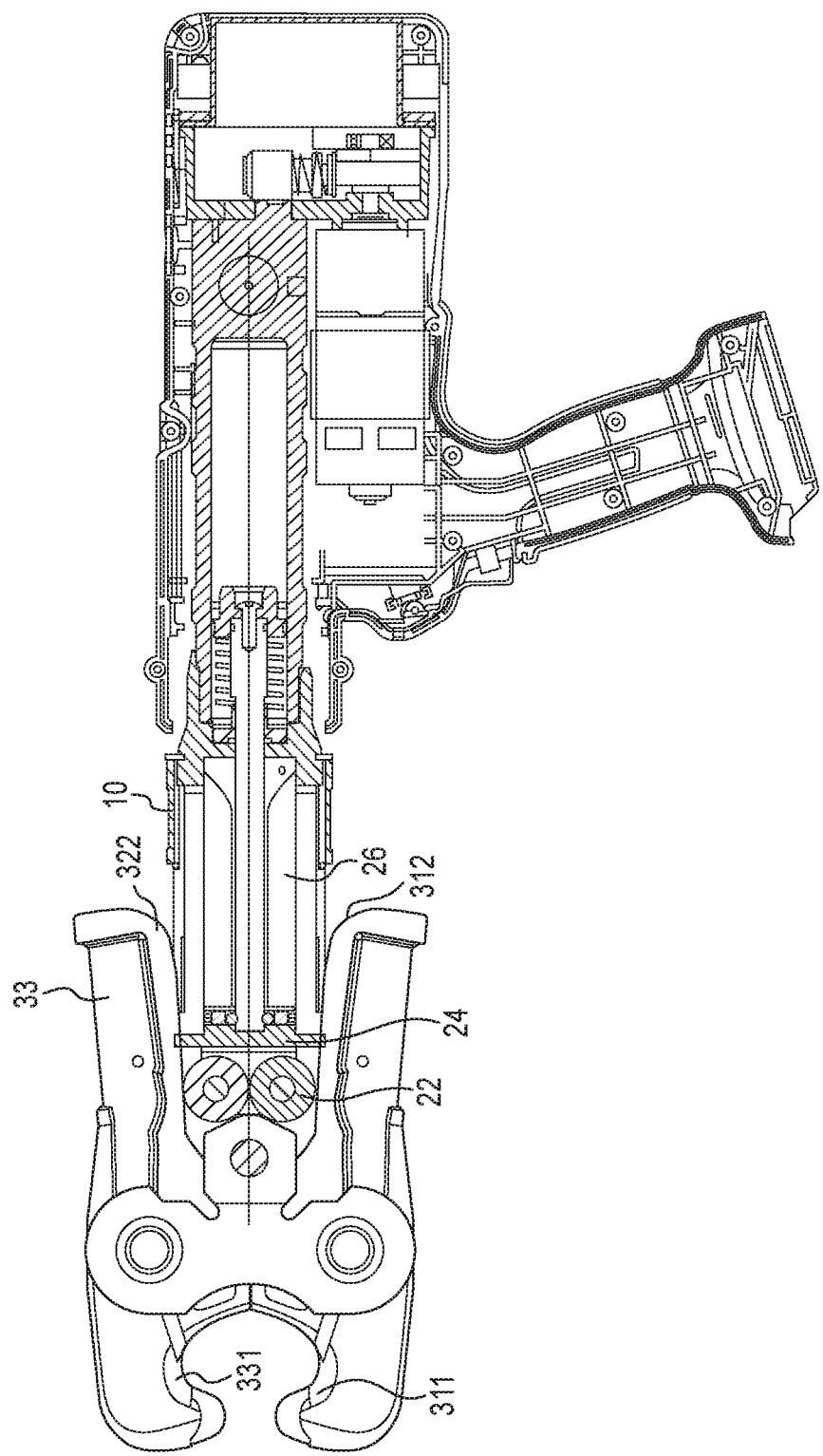
FIG. 3 is a schematic longitudinal sectional view of the hydraulic tool according to the embodiment of the present invention, wherein the switching device of the hydraulic tool is in the first rotation position and the roller is in an end position.

When the hydraulic cylinder body is filled with high-pressure fluid, the piston 23 and the piston rod 25 are pushed, by the high-pressure fluid, to move toward the crimping unit 30. When the crimping tool is not in operation, the piston 23 and the piston rod 25 are in an initial position (as shown in FIG. 2). The position corresponding to the maximum stroke of the piston 23 and the piston rod 25 during the crimping of the crimping tool is referred to as an end position (as shown in FIG. 3). That is, the piston 23 and the piston rod 25 are movable between the initial position and the end position. Simultaneously with the movement of the piston 23 and the piston rod 25, the piston 23 and the piston rod 25 push the driving parts (i.e., the cam faces 312 and 332) of the crimping members 31 and 33 to respectively pivot about the pins 32 and 34, so as to crimp the workpiece accommodated in the space defined by the crimping faces 311 and 331 of the crimping members 31 and 33. In one example, a spring 27 may further be provided on the piston rod 25. An elastic force opposite to the hydraulic pressure of the high-pressure fluid is exerted by the spring 27 on the piston 25 so that the piston 25 is forced back to the initial position after the pressure is released.

In one example, driving members, such as rollers 22, may be further provided at the free end of the piston rod 25, to push the crimping members 31 and 33 respectively. The rollers 22 may be mounted to the piston rod 25 in such a way that when the piston rod 25 translates, the rollers 22 can roll about their own central axis without any translation relative to the piston rod 25. As the rollers 22 act on the cam faces 312 and 332 of the crimping members 31 and 33 in a rolling manner, the friction between the rollers 22 and the cam faces 312 and 332 can be greatly reduced. Thus, energy consumption and the abrasion of the rollers 22, cam faces 312 and 332 are reduced.

Figure 12:
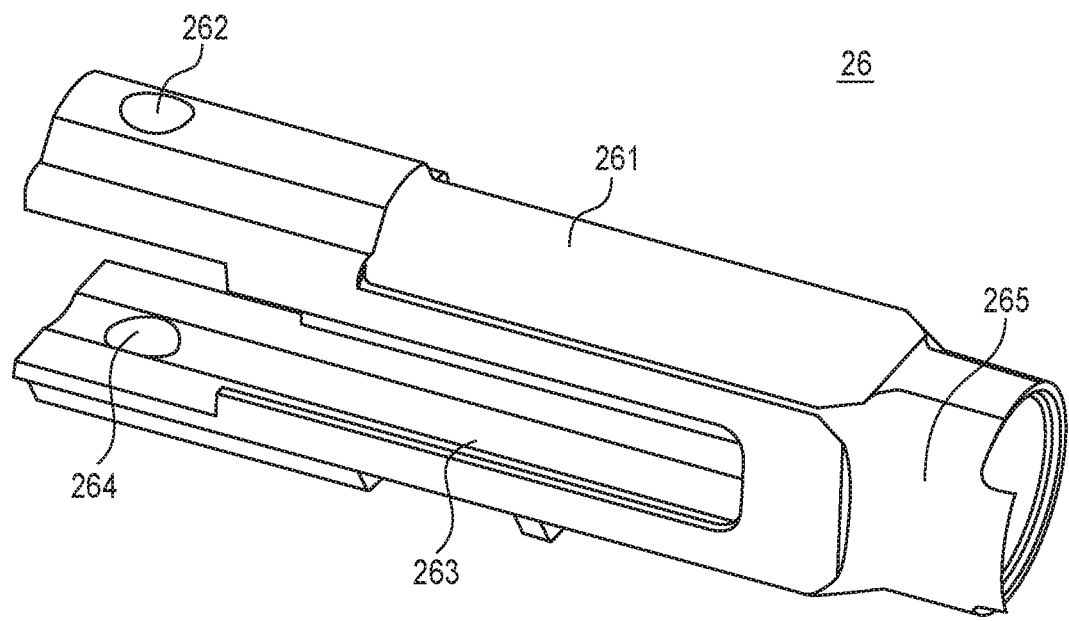
FIG. 12 is a schematic view of the connection unit according to the embodiment of the present invention.

A connection unit can be provided between the driving unit and the crimping unit. The connection unit may be a separate member fixedly connected to the driving unit or the working unit, or may be a part of the driving unit or the working unit. For example, the connection unit is a cylinder head of a hydraulic driving unit. Referring to FIG. 12, illustrating a schematic view of the connection unit according to an embodiment of the present invention. As shown, the connection unit 26 includes a base part 265, a first leg 261 extending from the base part 265, and a second leg 263 extending parallel to the first leg 261 from the base part 265. The crimping unit 30 is arranged between the first leg 261 and the second leg 263. In the illustrated example, the connection unit 26 is a part of the driving unit 20. For example, the base part 265 of the connection unit 26 is integrally formed with the cylinder body or the housing of the driving unit.

A through hole 262 may be provided in the first leg 261 in proximity to the free end thereof, and a through hole 264 may be provided in the second leg 263 in proximity to the free end thereof, so that the crimping unit 30 is detachably connected to the connection unit 26 through insertion of the pin 36 into the through hole 262 in the first leg 261, into the corresponding holes in the side plates 35, and into the through hole 264 in the second leg 263.

In order to facilitate the mounting of the rollers 22 to the piston rod 25, a bracket 24 may be provided. The bracket 24 is fixedly mounted to the piston rod 25. The rollers 22 are rotatably mounted to the bracket 24, and thereby connected to the piston rod 25 via the bracket 24. In the case where the rollers and the bracket are provided, the rollers and the bracket are also considered to be the movable part of the driving unit. The rollers 22 and the bracket 24 translate together with the piston rod 25, thus the stroke of the rollers 22 and bracket 24 is the same as the stroke of the piston rod 25 and piston 23, which is also referred to herein as the stroke of the movable part.

The hydraulic tool according to the present invention also includes a switching device that allows the movable part to switch between a long stroke and a short stroke. Referring to the drawings, the switching device 10 is provided on the outer surface of the connection unit 26 and adjacent to the hydraulic chamber of the hydraulic driving unit 20. The switching device 10 according to the present invention can rotate between a first position and a second position.

Figure 6:
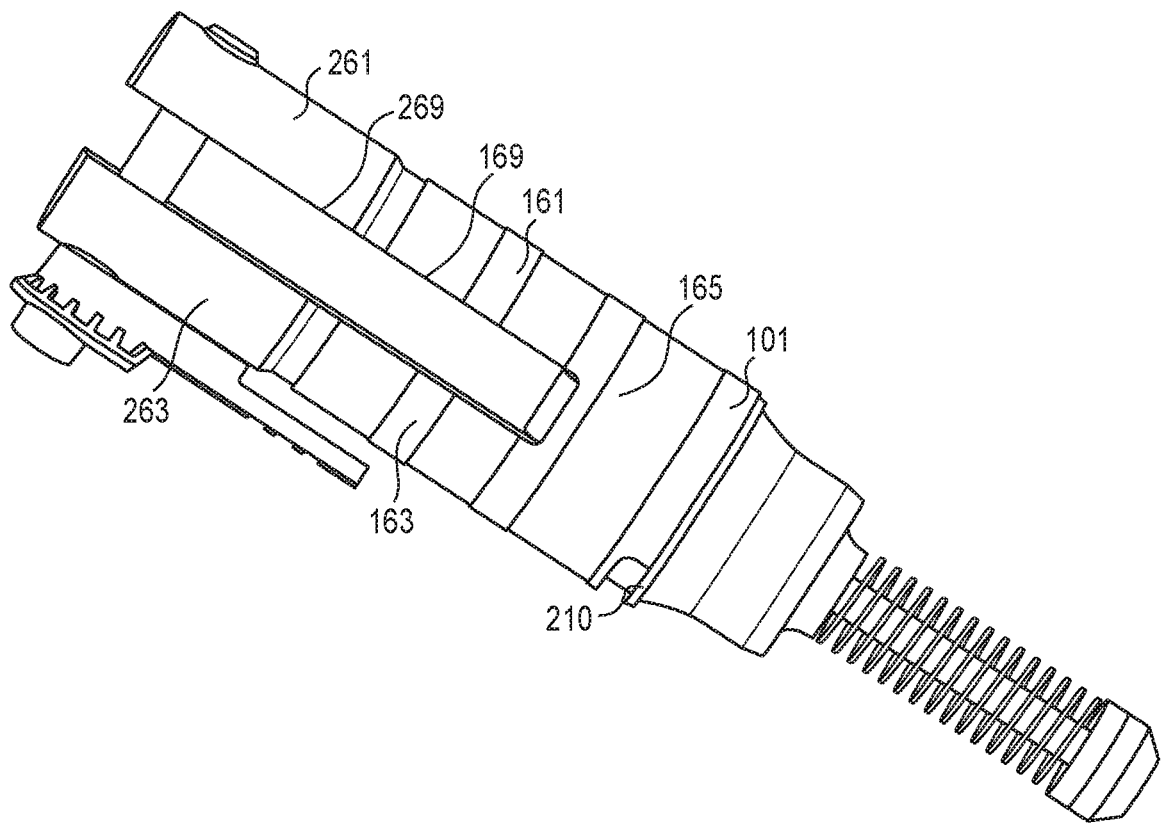
FIG. 6 shows a schematic view of an assembly of a cylinder head of the driving unit and the switching device according to the embodiment of the present invention, wherein the switching device is in the first rotation position.
Figure 7:
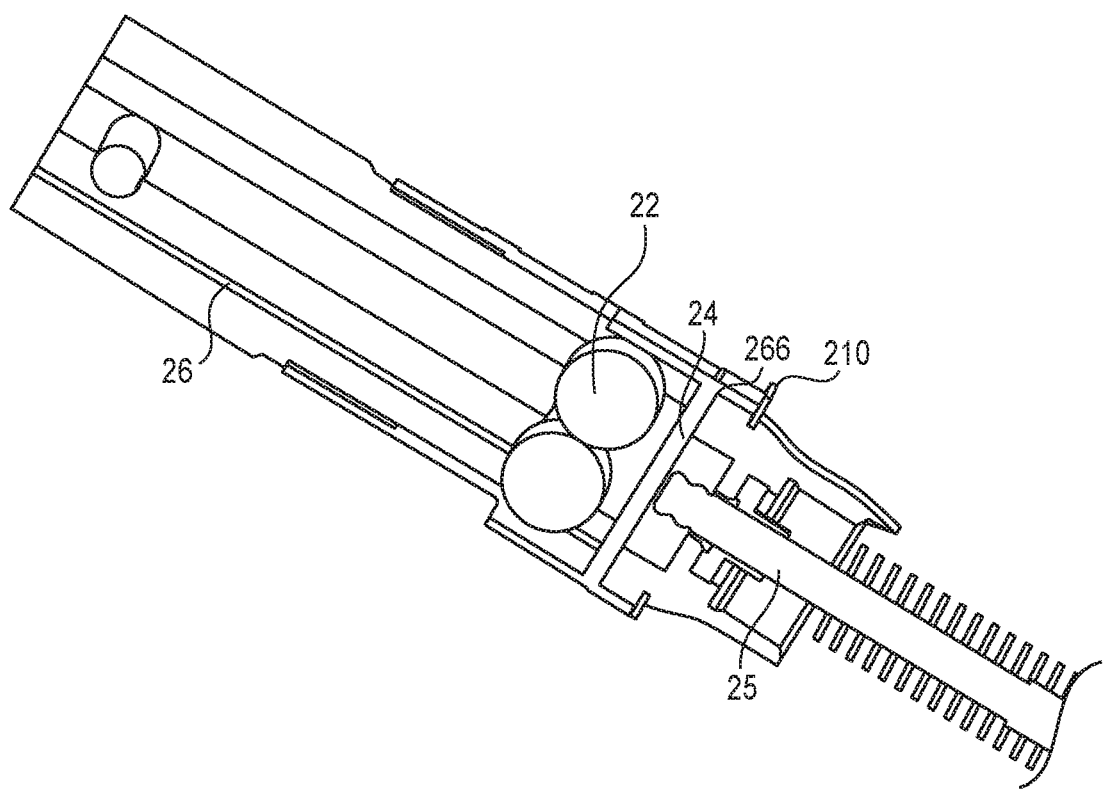
FIG. 7 is a schematic sectional view of FIG. 6.

Referring to FIGS. 6 and 7, the switching device 10 is in the first position and the bracket 24 is in its initial position. In this initial position, the bracket 24 abuts against the stopping part 266 of the connection unit 26. When the hydraulic chamber is filled with high-pressure fluid, the piston 23 is pushed by the pressure of the fluid to move, and thus drives the piston rod 25, the bracket 24, and the rollers 22 to move together. At this time, the bracket 24 moves away from the stopping part 266 toward the crimping unit 30. The crimping members 31 and 33 pivot about pins 32 and 34 respectively to crimp the workpiece. When a desired crimping level is reached, the fluid pressure in the hydraulic chamber reaches a maximum value, and the movable part also arrives at the end position. At this time, the pressure relief valve opens and the fluid pressure in the hydraulic chamber drops. Under the action of the spring 27, the piston 23 returns until the bracket 24 abuts against the stopping part 266 and arrives at its initial position. When the switching device 10 is in the first position, the movable part of the driving unit 20 moves over a first stroke from its initial position to the end position.

Figure 9:
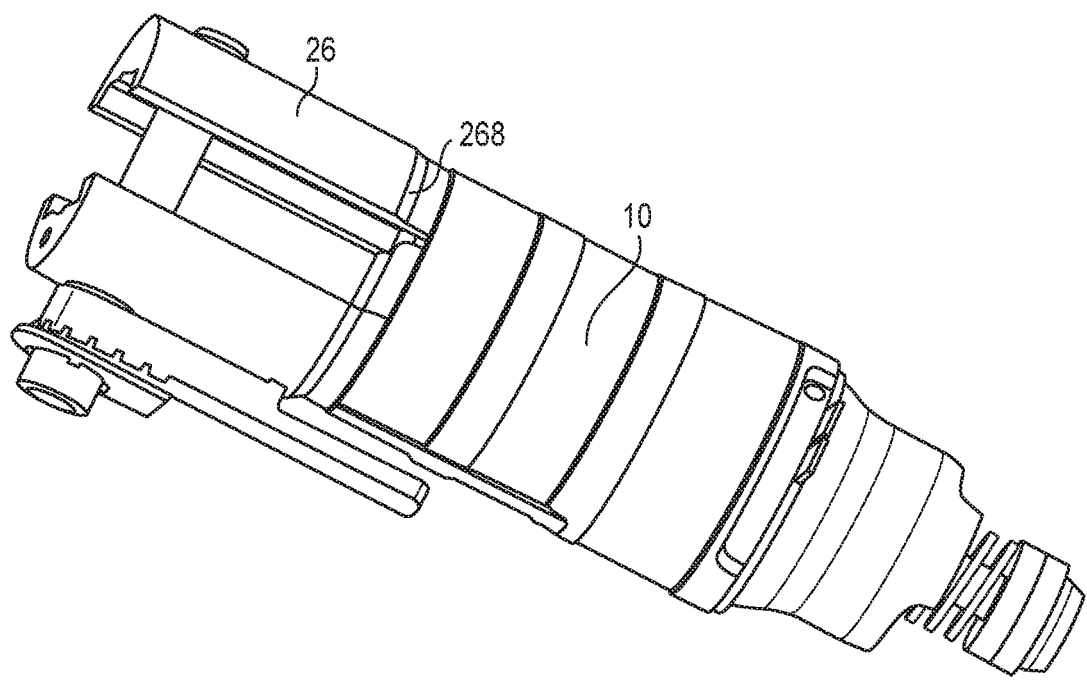
FIG. 9 shows a schematic view of an assembly of a cylinder head of the driving unit and the switching device according to the embodiment of the present invention, wherein the switching device is in the second rotation position.
Figure 10:
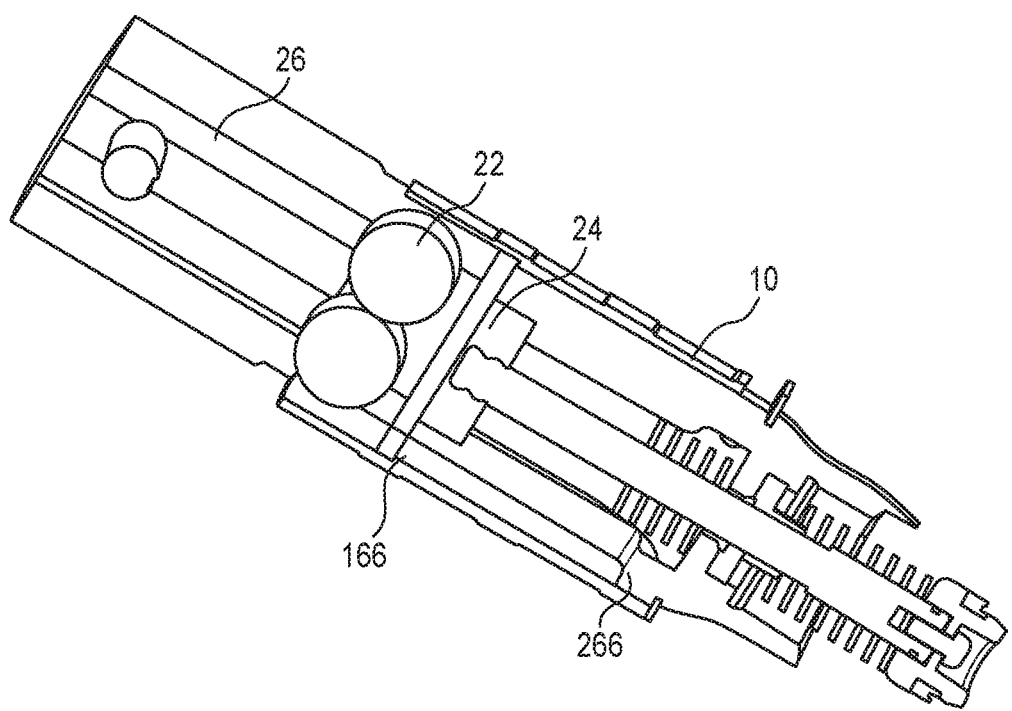
FIG. 10 is a schematic sectional view of FIG. 9.

Referring to FIGS. 9 and 10, the switching device 10 is in the second position. A stopper 166 is provided on the inner surface of the switching device 10. As shown in FIG. 10, the bracket 24 is stopped by the stopper 166 at an intermediate position between its initial position and end position. That is, due to the presence of the stopper 166, the bracket 24 cannot return to the initial position as shown in FIG. 7. In this case, when the hydraulic chamber is filled with high-pressure fluid, the piston 23 is pushed by the pressure of the fluid to move, and thus drives the piston rod 25, the bracket 24, and the rollers 22 to move together. At this time, the bracket 24 begins to move from the intermediate position as shown in FIG. 10 toward the crimping unit 30. The crimping members 31 and 33 pivot about pins 32 and 34 respectively to crimp the workpiece. When a desired crimping level is reached, the fluid pressure in the hydraulic chamber reaches a maximum value, and the movable part also arrives at the end position. At this time, the pressure relief valve opens and the fluid pressure in the hydraulic chamber drops. Under the action of the spring 27, the piston 23 returns until the bracket 24 abuts against the stopper 166 and arrives at the intermediate position as shown in FIG. 10. When the switching device 10 is in the second position, the movable part of the driving unit 20 moves over a second stroke from the intermediate position to the end position, which is smaller than the above first stroke. The first stroke may be between 90 mm and 265 mm, preferably 100 mm. The second stroke may be between 35 mm and 50 mm, preferably 41 mm.

By rotating the switching device 10 from the first position to the second position, the stroke of the movable part of the driving unit 20 may be changed. The switching device according to the present invention is simple in structure and easy to operate.

In the illustrated example, a part of the switching device 10 adjacent to the driving unit 20 has a first inner diameter, and a part of the switching device 10 adjacent to the crimping unit 30 has a second inner diameter greater than the first inner diameter. As such, the stopper 166 takes the form of a step. However, it should be understood that the stopper 166 may also take any other suitable form capable of implementing the above functions. For example, the stopper may take the form of a projection, a shoulder, or the like that can serve to stop the movable part of the driving unit when the switching device is in the second position. Alternatively, holes may be provided at appropriate positions of the switching device and the connection unit. When the switching device is in the second position, the pin is inserted into the connection unit through these holes and serves to stop the bracket 24.

Figure 14:
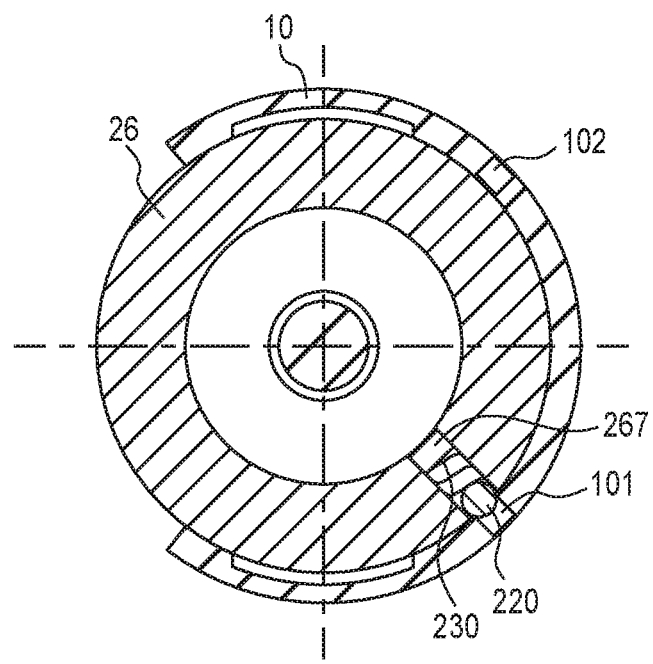
FIG. 14 is a schematic view for positioning the switching device at the first rotation position.
Figure 16:
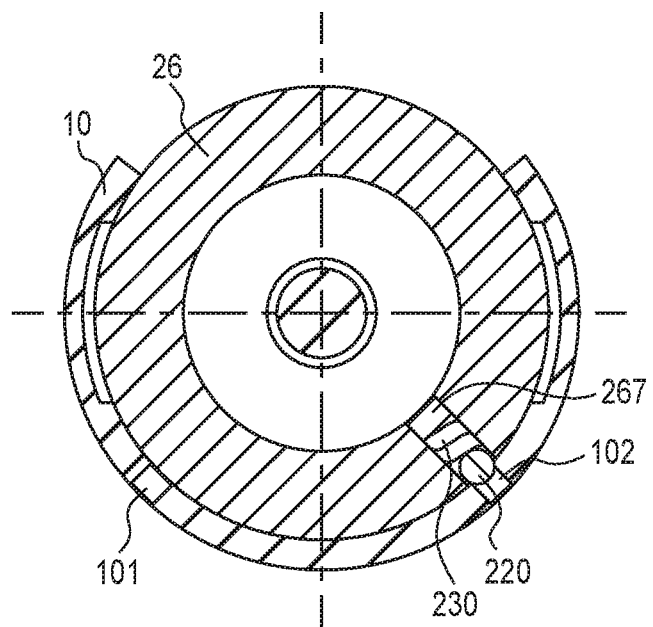
FIG. 16 is a schematic view for positioning the switching device at the second rotation position.

In another example, the hydraulic tool according to the present invention may also be provided with a positioning device for positioning the switching device at the first position and/or the second position. FIG. 14 is a schematic view for positioning the switching device at a first rotation position; FIG. 16 is a schematic view for positioning the switching device at a second rotation position. The positioning device according to an embodiment of the present invention will be described below with reference to FIGS. 14 and 16.

Figure 15:
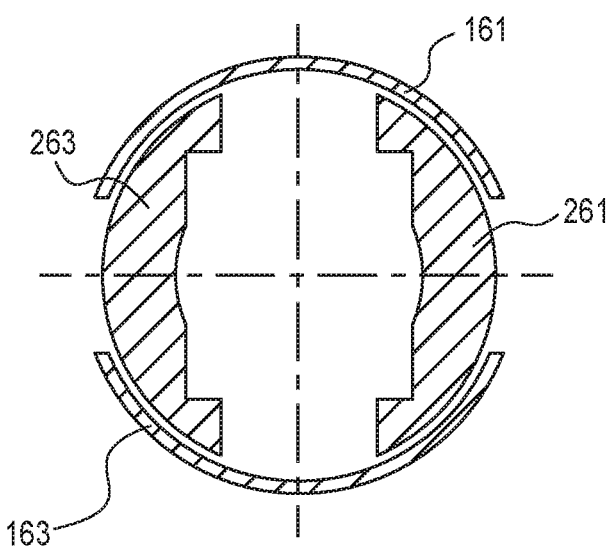
FIG. 15 is a sectional view of the switching device and the cylinder head when the switching device is in the second rotation position.

The positioning device according to the embodiment of the present invention includes a ball 220 and a spring (elastic member) 230. An accommodation part 267 for accommodating the ball 220 and the spring 230 is provided in the connection unit 26. In the illustrated example, the switching device 10 is provided outside the connection unit 26. The accommodation part 267 takes the form of a radially extending hole in which the ball 220 and the spring 230 are accommodated, wherein the ball 220 is located radially outward of the spring 230. The spring 230 biases the ball 220 radially outward, i.e., toward the switching unit 10. The switching device 10 is provided with a first hole 101 and a second hole 102. When the switching device 10 is in the first position, the spring 230 presses the ball 220 so that the ball 220 abuts against the first hole 101 (as shown in FIG. 15). When the switching device 10 is in the second position, the spring 230 presses the ball 220 so that the ball 220 abuts against the second hole 102 (as shown in FIG. 16). When the ball 220 abuts against the first hole 101 or the second hole 102, device 10 may be prevented from rotating relative to the connection unit 26.

In another embodiment according to the present invention, the hydraulic tool may further include a limiter for limiting the axial position of the switching device. As shown, the limiter according to the embodiment of the present invention includes a collar 210 adjacent to one end of the switching device 10. As shown in FIG. 9, the collar 210 is mounted on the connection unit 26. In addition, a step part 268 may be provided on the outer surface of the connection unit 26 adjacent to the other end of the switching device 10 to prevent the switching device 10 from moving in the axial direction toward the left side in FIG. 9.

In addition, the structure of the switching device according to the present invention may also be configured to allow the replacement with working units of different specifications. A switching device according to another embodiment of the present invention is described below with reference to FIGS. 6, 8, 9 and 11.

As shown in FIGS. 6, 8, 9 and 11, the switching device 10 is substantially cylindrical and has a structure similar to that of the connection unit 26. The switching device 10 may include a base part 165, a first leg 161 extending from the base part 165, and a second leg 163 extending parallel to the first leg 161 from the base part 165. It should be understood that the switching device 10 may have a circumference greater than 180 degrees as long as it can be mounted on the connection unit and rotated relative to the connection unit.

Figure 8:
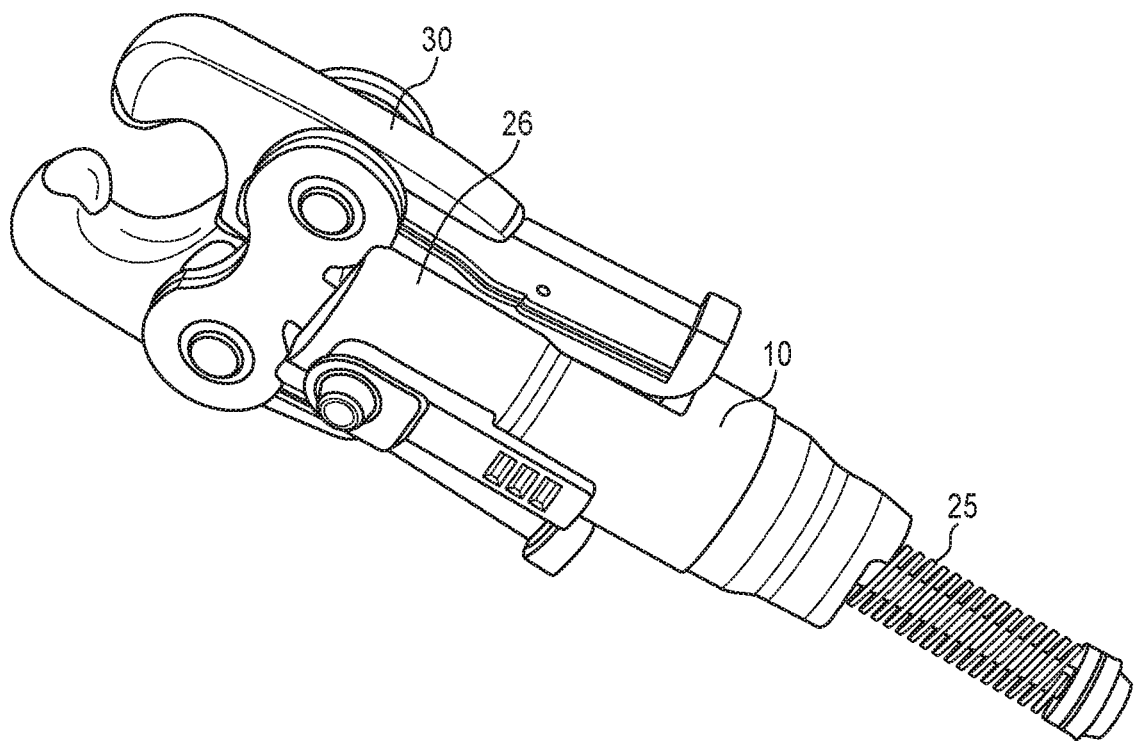
FIG. 8 is a schematic view of a hydraulic tool equipped with a large working unit according to an embodiment of the present invention, wherein the switching device is in the first rotation position.
Figure 13:
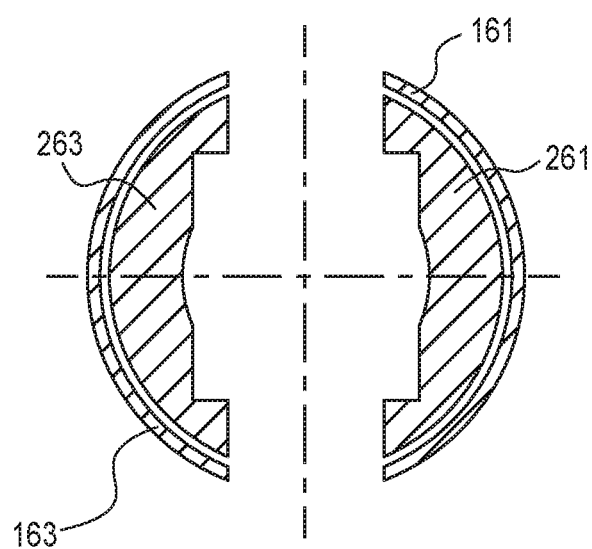
FIG. 13 is a sectional view of the switching device and the cylinder head when the switching device is in the first rotation position.

When the switching device 10 is in the first position as shown in FIG. 6, a first recess formed between the first leg 161 and the second leg 163 of the switching device 10 is radially aligned with a second recess formed between the first leg 261 and the second leg 263 of the connection unit 26, so as to accommodate the long crimping members 31 and 33 (as shown in FIGS. 8 and 13).

Figure 11:
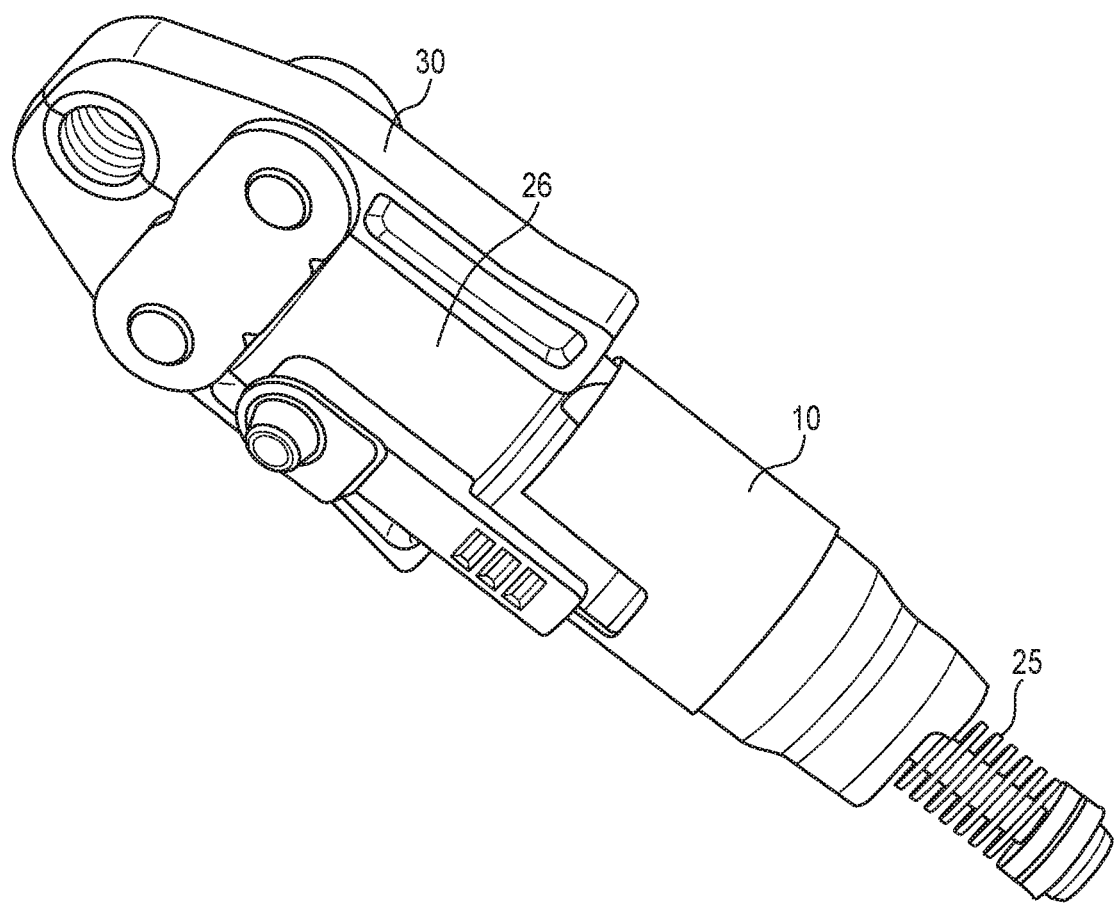
FIG. 11 is a schematic view of a hydraulic tool equipped with a small working unit according to an embodiment of the present invention, wherein the switching device is in the second rotation position.

When the switching device 10 is in the second position as shown in FIG. 9, the first leg 161 and the second leg 163 of the switching device 10 cover a part of the second recess of the connection unit 26, such that only short crimping members 31 and 33 (as shown in FIGS. 11 and 15) can be accommodated.

Figure 4:
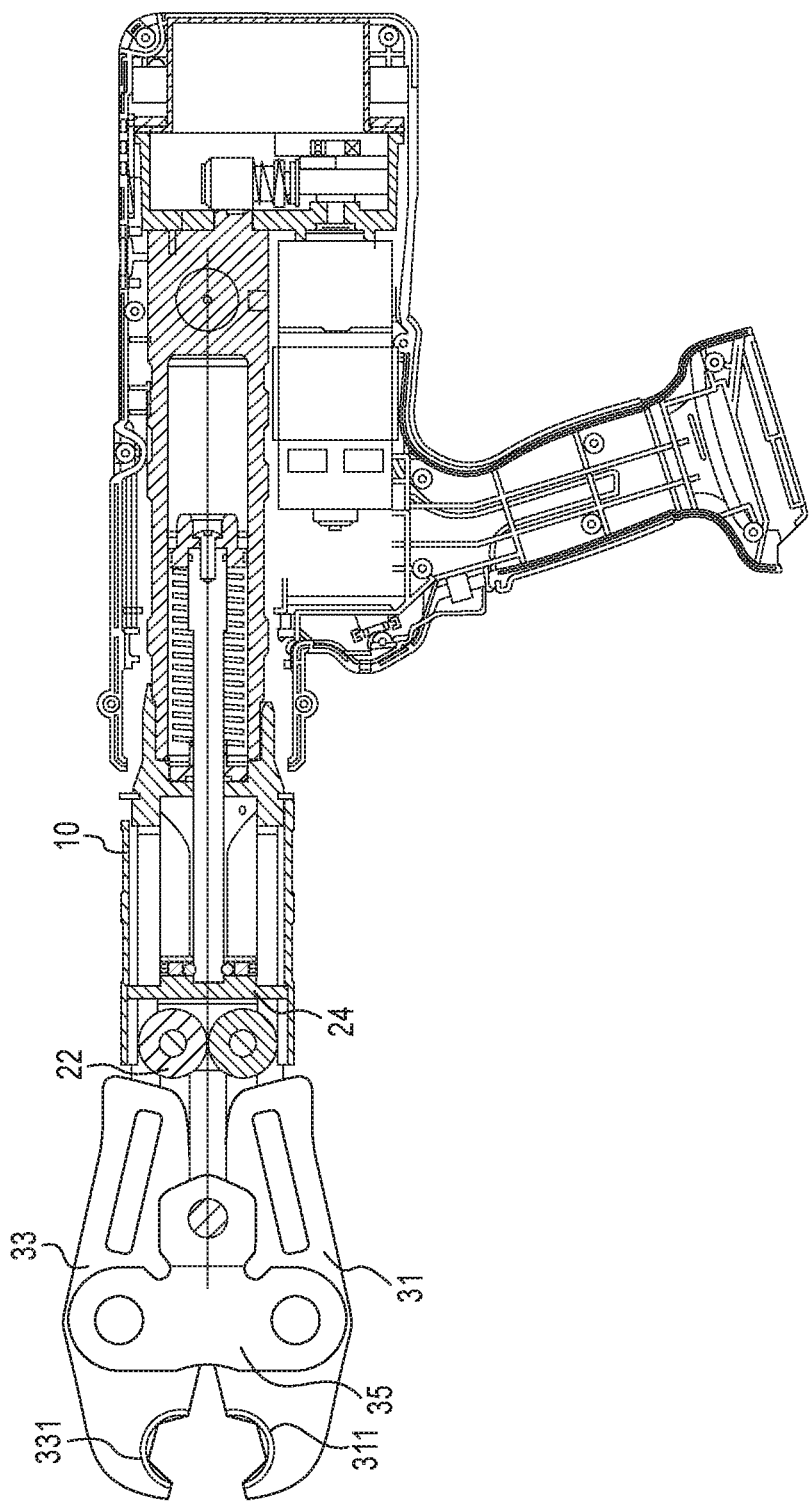
FIG. 4 is a schematic longitudinal sectional view of the hydraulic tool according to the embodiment of the present invention, wherein the switching device of the hydraulic tool is in a second rotation position and the roller is in an intermediate position.
Figure 5:
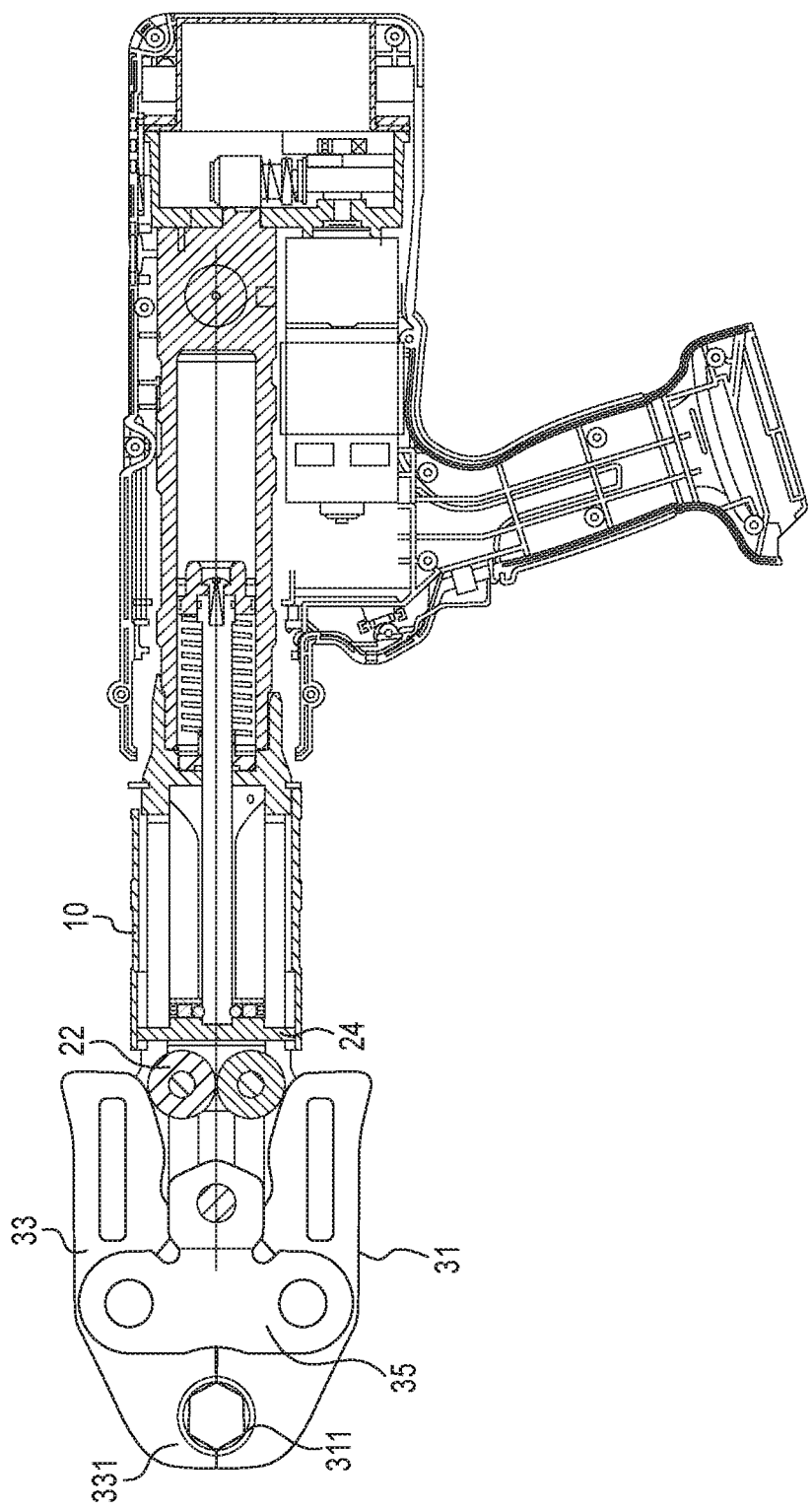
FIG. 5 is a schematic longitudinal sectional view of the hydraulic tool according to the embodiment of the present invention, wherein the switching device of the hydraulic tool is in the second rotation position and the roller is in the end position.

FIGS. 2 and 3 are schematic longitudinal sectional views of a crimping tool equipped with long crimping members, wherein the movable part of the driving unit is in an initial position in FIG. 2 and in an end position in FIG. 3. FIGS. 4 and 5 are schematic longitudinal sectional views of a crimping tool equipped with short crimping members, wherein the movable part of the driving unit is in an intermediate position in FIG. 4 and is in an end position in FIG. 5. By contrast, the stroke of the movable part of the driving unit in FIGS. 2 and 3 is greater than the stroke in FIGS. 4 and 5. Therefore, the switching device according to the present invention can not only change the stroke of the movable part of the driving unit but also can replace hydraulic tools with different specifications.

It should be understood that the structure of the switching device according to the present invention is not limited to the illustrated structure, as long as the above functions can be achieved.

The above description is merely intended to describe the principles of the present invention and the functions of the various parts with reference to the preferred embodiments of the drawings. It is appreciated, however, that the present invention is not limited to the illustrated embodiments as long as the structure of various parts of the hydraulic tool can achieve the above functions and purposes. Many modifications can be made to the above embodiments without departing from the scope of the present invention. In addition, all the members described herein can be replaced with other technically equivalent members. The scope of the present invention should be defined by the appended claims.

What is claimed is:
1. A hydraulic tool, comprising:
a working unit adapted to operate a workpiece;

a driving unit configured to drive the working unit, comprising a housing and a movable part provided in the housing and movable between an initial position and an end position;
a connection unit connecting the working unit and the driving unit; and
a switching device rotatable between a first position and a second position;
wherein, when the switching device is in the first position, the movable part of the driving unit has a first stroke from the initial position to the end position;
when the switching device is in the second position, the movable part of the driving unit has a second stroke smaller than the first stroke
wherein the switching device is a sleeve provided on an outer surface of the connection unit,
wherein the switching device comprises a stopper,
when the switching device is in the first position, the stopper of the switching device does not prevent the movement of the movable part of the driving unit such that the movable part is able to move between the initial position and the end position,
when the switching device is in the second position, the stopper of the switching device is able to stop the movable part of the driving unit at an intermediate position between the initial position and the end position, such that the movable part is able to move between the intermediate position and the end position.

2. The hydraulic tool of claim 1, wherein the hydraulic tool further comprises a driving member for driving the working unit, the driving member is mounted on a bracket that is fixedly mounted at an end of a piston rod of the driving unit, and the stopper of the switching device is configured to stop the bracket.

3. The hydraulic tool of claim 1, wherein the stopper is a projection member extending from the inner surface of the sleeve, the projection member is integrally formed with the sleeve or separately formed with the sleeve and mounted to the sleeve.

4. A hydraulic tool, comprising:
a working unit adapted to operate a workpiece;
a driving unit configured to drive the working unit, comprising a housing and a movable part provided in the housing and movable between an initial position and an end position;
a connection unit connecting the working unit and the driving unit; and
a switching device rotatable between a first position and a second position;
wherein, when the switching device is in the first position, the movable part of the driving unit has a first stroke from the initial position to the end position;
when the switching device is in the second position, the movable part of the driving unit has a second stroke smaller than the first stroke;
wherein the hydraulic tool further comprises a positioning device for positioning the switching device at the first position and/or the second position,
wherein the positioning device comprises a ball, and an elastic member for applying a biasing force to the ball, an accommodation part for accommodating the ball and the elastic member is provided in the connection unit,
a first hole and a second hole are provided in the switching device, wherein, when the switching device is in the first position, the elastic member presses the ball such that the ball abuts against the first hole, and when the switching device is in the second position, the elastic member presses the ball such that the ball abuts against the second hole.

5. A hydraulic tool, comprising:
a working unit adapted to operate a workpiece;
a driving unit configured to drive the working unit, comprising a housing and a movable part provided in the housing and movable between an initial position and an end position;
a connection unit connecting the working unit and the driving unit; and
a switching device rotatable between a first position and a second position;
wherein, when the switching device is in the first position, the movable part of the driving unit has a first stroke from the initial position to the end position;
when the switching device is in the second position, the movable part of the driving unit has a second stroke smaller than the first stroke;
wherein the hydraulic tool further comprises a limiter for limiting the axial position of the switching device,
wherein the limiter comprises a collar provided adjacent to one end of the switching device.

6. The hydraulic tool of claim 5, wherein the limiter further comprises a step part provided adjacent to the other end of the switching device and positioned on the outer surface of the connection unit.

7. A hydraulic tool, comprising:
a working unit adapted to operate a workpiece;
a driving unit configured to drive the working unit, comprising a housing and a movable part provided in the housing and movable between an initial position and an end position;
a connection unit connecting the working unit and the driving unit; and
a switching device rotatable between a first position and a second position;
wherein, when the switching device is in the first position, the movable part of the driving unit has a first stroke from the initial position to the end position;
when the switching device is in the second position, the movable part of the driving unit has a second stroke smaller than the first stroke;
wherein the connection unit comprises a base part, and a first leg and a second leg extending parallel from the base part,
wherein, the working unit is mounted between the first leg and the second leg; and
the base part is connected to or integral with the driving unit,
wherein the switching device comprises a base part, and a first leg and a second leg extending parallel from the base part,
when the switching device is in the first position, a first recess formed between the first leg of the switching device and the second leg of the switching device is aligned with a second recess formed between the first leg of the connection unit and the second leg of the connection unit,
when the switching device is in the second position, the second recess of the connection unit is at least partially covered by the first leg and/or the second leg of the switching device.

8. The hydraulic tool of claim 7, wherein when the switching device is in the first position, the first stroke of the movable part ranges from 90 mm to 265 mm.

9. The hydraulic tool of claim 7, wherein when the switching device is in the first position, the first stroke of the movable part is 100 mm.

10. The hydraulic tool of claim 7, wherein when the switching device is in the second position, the second stroke of the movable part ranges from 35 mm to 50 mm.

11. The hydraulic tool of claim 7, wherein when the switching device is in the second position, the second stroke of the movable part is 41 mm.

12. The hydraulic tool of claim 7, wherein the hydraulic tool is a tool selected from the group consisting of a crimping tool, a clamping tool and a cutting tool.

13. A hydraulic tool, comprising:
a crimping unit configured to crimp a workpiece such as tubing;
a hydraulic driving unit configured to drive the crimping unit, wherein the hydraulic driving unit comprises a cylinder body and a piston provided in the cylinder body, wherein the piston is movable between an initial position and an end position;
a connection unit connecting the crimping unit and the hydraulic driving unit; and
a switching device rotatable between a first position and a second position;
wherein, when the switching device is in the first position, the piston of the hydraulic driving unit moves over a first stroke from the initial position to the end position;
wherein, when the switching device is in the second position, the piston of the hydraulic driving unit moves over a second stroke less than the first stroke;
wherein the switching device is a sleeve provided on an outer surface of the connection unit;
wherein an inner surface of the switching device includes a stopper;
wherein, when the switching device is in the first position, the stopper of the switching device does not prevent the movement of the piston of the hydraulic driving unit such that the piston is able to move between the initial position and the end position,
wherein, when the switching device is in the second position, the stopper of the switching device is able to stop the piston of the hydraulic driving unit at an intermediate position between the initial position and the end position, such that the piston is only able to move between the intermediate position and the end position.

14. A hydraulic tool, comprising:
a crimping unit configured to crimp a workpiece such as tubing;
a hydraulic driving unit configured to drive the crimping unit, wherein the hydraulic driving unit comprises a cylinder body and a piston provided in the cylinder body, wherein the piston is movable between an initial position and an end position;
a connection unit connecting the crimping unit and the hydraulic driving unit; and
a switching device rotatable between a first position and a second position;
wherein, when the switching device is in the first position, the piston of the hydraulic driving unit moves over a first stroke from the initial position to the end position;
wherein, when the switching device is in the second position, the piston of the hydraulic driving unit moves over a second stroke less than the first stroke;
wherein the hydraulic tool further comprises a positioning device for positioning the switching device at the first position and/or the second position,
wherein the positioning device comprises a ball and a spring, wherein the spring applies a biasing force to the ball, and wherein the connection unit includes an accommodation part for accommodating the ball and the spring;
wherein the switching device defines a first hole and a second hole; wherein, when the switching device is in the first position, the spring biases the ball such that the ball abuts against the first hole, and when the switching device is in the second position, the spring biases the ball such that the ball abuts against the second hole.

15. A hydraulic tool, comprising:
a crimping unit configured to crimp a workpiece such as tubing;
a hydraulic driving unit configured to drive the crimping unit, wherein the hydraulic driving unit includes a cylinder body and a piston provided in the cylinder body, wherein the piston is movable between an initial position and an end position;
a connection unit connecting the crimping unit and the hydraulic driving unit; and
a switching device rotatable between a first position and a second position;
wherein, when the switching device is in the first position, the piston of the hydraulic driving unit moves over a first stroke from the initial position to the end position;
wherein, when the switching device is in the second position, the piston of the hydraulic driving unit moves over a second stroke less than the first stroke;
wherein the hydraulic tool further comprises a limiter for limiting the axial position of the switching device,
wherein the limiter comprises a collar provided adjacent to one end of the switching device.

16. A hydraulic tool, comprising:
a crimping unit configured to crimp a workpiece such as tubing;
a hydraulic driving unit configured to drive the crimping unit, wherein the hydraulic driving unit includes a cylinder body and a piston provided in the cylinder body, wherein the piston is movable between an initial position and an end position;
a connection unit connecting the crimping unit and the hydraulic driving unit; and
a switching device rotatable between a first position and a second position;
wherein, when the switching device is in the first position, the piston of the hydraulic driving unit moves over a first stroke from the initial position to the end position;
wherein, when the switching device is in the second position, the piston of the hydraulic driving unit moves over a second stroke less than the first stroke;
wherein the connection unit comprises a base part, a first leg and a second leg, wherein the first leg and the second leg extend parallel from the base part;
wherein the switching device includes a base part, a first leg and a second leg, wherein the first leg and the second leg extend parallel from the base part, and wherein, when the switching device is in the first position, a first recess formed between the first leg and the second leg of the switching device is aligned with a second recess formed between the first leg and the second leg of the connection unit; and
wherein, when the switching device is in the second position, the second recess of the connection unit is at least partially covered by the first leg and/or the second leg of the switching device.

\* \* \* \* \*